United States Patent
Sun et al.

(10) Patent No.: US 12,455,844 B2
(45) Date of Patent: Oct. 28, 2025

(54) IO REQUEST SCHEDULING METHODS AND APPARATUSES

(71) Applicant: BEIJING OCEANBASE TECHNOLOGY CO., LTD., Beijing (CN)

(72) Inventors: Jianyun Sun, Hangzhou (CN); Yuzhong Zhao, Hangzhou (CN)

(73) Assignee: Beijing Oceanbase Technology Co., Ltd., Beijing (CN)

(*) Notice: Subject to any disclaimer, the term of this patent is extended or adjusted under 35 U.S.C. 154(b) by 115 days.

(21) Appl. No.: 18/553,145

(22) PCT Filed: Apr. 6, 2022

(86) PCT No.: PCT/CN2022/085281
§ 371 (c)(1),
(2) Date: Sep. 28, 2023

(87) PCT Pub. No.: WO2022/213973
PCT Pub. Date: Oct. 13, 2022

(65) Prior Publication Data
US 2024/0378159 A1 Nov. 14, 2024

(30) Foreign Application Priority Data
Apr. 8, 2021 (CN) .......................... 202110375903.8

(51) Int. Cl.
*G06F 13/16* (2006.01)
*G06F 3/06* (2006.01)

(52) U.S. Cl.
CPC ............................... *G06F 13/1689* (2013.01)

(58) Field of Classification Search
CPC .................................................. G06F 13/1689
(Continued)

(56) References Cited

U.S. PATENT DOCUMENTS

| 7,263,587 B1 * | 8/2007 | Yeh ..................... H04N 21/4435 |
| | | 711/158 |
| 10,592,137 B1 | 3/2020 | Khokhar et al. |

(Continued)

FOREIGN PATENT DOCUMENTS

| CN | 107295090 A | 10/2017 |
| CN | 109783028 A | 5/2019 |
| CN | 112799606 A | 5/2021 |

OTHER PUBLICATIONS

The International Search Report and Written Opinion for International Application No. PCT/CN2022/085281 mailed on Jun. 15, 2022.

*Primary Examiner* — Chun Kuan Lee
(74) *Attorney, Agent, or Firm* — Womble Bond Dickinson (US) LLP

(57) ABSTRACT

The specification provides an IO request scheduling method. The method includes: obtaining a target IO request to be scheduled, and determining whether the target IO request is a traffic-limited IO request: when the target IO request is a traffic-unlimited first-type IO request, determining a current moment as a scheduling moment of the target IO request: or when the target IO request is a traffic-limited second-type IO request, determining a scheduling moment of the target IO request based on a current resource traffic-limiting proportion; and adding the target IO request to an IO request set, where several IO requests in the IO request set are sequentially sent to a disk for processing in ascending order of scheduling moments.

13 Claims, 4 Drawing Sheets

(58) Field of Classification Search
USPC .......................................................... 710/22
See application file for complete search history.

(56) References Cited

U.S. PATENT DOCUMENTS

| | | | |
|---|---|---|---|
| 2003/0229762 A1* | 12/2003 | Maiyuran | G06F 12/0215 |
| | | | 711/E12.004 |
| 2008/0273591 A1* | 11/2008 | Brooks | H04N 21/6373 |
| | | | 375/240.01 |
| 2010/0036851 A1* | 2/2010 | Paterson-Jones | G06F 3/0619 |
| | | | 707/E17.032 |
| 2010/0082849 A1* | 4/2010 | Millet | G06F 13/128 |
| | | | 710/22 |

* cited by examiner

IO REQUEST SCHEDULING METHODS AND APPARATUSES

CROSS-REFERENCE TO RELATED APPLICATIONS

This application is a national-phase entry of International Application No. PCT/CN2022/085281 filed on Apr. 6, 2022, which claims priority to Chinese Application No. 202110375903.8 filed on Apr. 8, 2021, the contents of which are incorporated herein by reference in their entirety.

TECHNICAL FIELD

One or more embodiments of this specification relate to the computer field, and in particular, to IO request scheduling methods and apparatuses.

BACKGROUND

For some data storage systems, for example, a database based on a log-structured merge tree (LSM) structure, not only an IO request initiated by a data query request (which can also be referred to as a foreground task) from an application needs to occupy IO resources of a disk, but an IO request initiated by an irregular background task (for example, a dump task or a merge task) may need to occupy IO resources of the disk. When the IO request initiated by the background task occupies too many IO resources, a response time of the IO request initiated by the foreground task is increased, which causes the system to stall and affects user experience.

Generally, to ensure efficient running of the system to improve user experience, some IO requests may need to be processed as soon as possible. However, to ensure that users have better user experience, both the IO request initiated by the foreground task and the IO request initiated by the background task should be processed as soon as possible.

Therefore, a new technical solution is desired to better complete IO request scheduling.

SUMMARY

One or more embodiments of this specification provide IO request scheduling methods and apparatuses, so that IO request scheduling can be better completed.

According to a first aspect, an IO request scheduling method is provided. The method includes: obtaining a target IO request to be scheduled, and determining whether the target IO request is a traffic-limited IO request; when the target IO request is a traffic-unlimited first-type IO request, determining a current moment as a scheduling moment of the target IO request; or when the target IO request is a traffic-limited second-type IO request, determining a scheduling moment of the target IO request based on a current resource traffic-limiting proportion, where the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and then adding the target IO request to an IO request set, where several IO requests in the IO request set are sequentially sent to a disk for processing in ascending order of scheduling moments.

In a possible implementation, the first-type IO request includes a foreground IO request, and the second-type IO request includes a background IO request.

In a possible implementation, the adding the target IO request to an IO request set specifically includes: adding the target IO request to an IO request set managed by using a minimum heap.

In a possible implementation, the determining a scheduling moment of the target IO request based on a current resource traffic-limiting proportion includes: calculating an expected scheduling moment of the target IO request based on the current resource traffic-limiting proportion and a scheduling moment of an obtained last second-type IO request, where the expected scheduling moment is negatively correlated with the current resource traffic-limiting proportion; and determining the larger value of the current moment and the expected scheduling moment as the scheduling moment of the target IO request.

In a possible implementation, the determining a scheduling moment of the target IO request based on a current resource traffic-limiting proportion further includes: determining an expected read/write frequency corresponding to request bandwidth of the target IO request based on performance of the disk. Correspondingly, the calculating an expected scheduling moment of the target IO request based on the current resource traffic-limiting proportion and a scheduling moment of an obtained last second-type IO request specifically includes: calculating the expected scheduling moment of the target IO request based on the expected read/write frequency, the current resource traffic-limiting proportion, and the scheduling moment of the obtained last second-type IO request, where the expected scheduling moment is negatively correlated with the expected read/write frequency.

In a possible implementation, when the target IO request is a traffic-unlimited first-type IO request, the method further includes: determining a first moment of obtaining the target IO request; at a second moment, selecting the target IO request from the IO request set, and sending the target IO request to the disk, where at the second moment, the scheduling moment of the target IO request is a smallest value of all IO requests included in the IO request set; receiving a request result returned by the disk; sending the request result to an application corresponding to the target IO request, and determining a third moment of sending the request result; and determining a response time of the target IO request based on the third moment and the first moment.

In a possible implementation, the method further includes: when an end moment of the current time period is reached, determining a next resource traffic-limiting proportion of a next time period based on current load information of first-type IO requests scheduled in the current time period, where the current load information specifically includes an average response time of the first-type IO requests scheduled in the current time period and average request bandwidth of the first-type IO requests scheduled in the current time period.

In a possible implementation, the determining a next resource traffic-limiting proportion of a next time period based on current load information of first-type IO requests scheduled in the current time period includes: determining an expected response time corresponding to the average request bandwidth based on the performance of the disk; and when the average response time is not less than the expected response time, reducing the current resource traffic-limiting proportion based on a predetermined step to obtain the next resource traffic-limiting proportion of the next time period; or when the average response time is less than the expected response time, increasing the current resource traffic-limiting proportion based on a predetermined step to obtain the next resource traffic-limiting proportion of the next time period.

In a possible implementation, the next resource traffic-limiting proportion of the next time period is not greater than a first predetermined threshold and is not less than a second predetermined threshold.

According to a second aspect, an IO request scheduling method is provided, including: obtaining an IO request set, where the IO request set is obtained by using the method according to any one of the implementations of the first aspect, the IO request set includes several IO requests, and each IO request has a corresponding scheduling moment; selecting, from the IO request set, an IO request with a smallest scheduling moment as a current IO request; and sending the current IO request to a disk, so that the disk processes the current IO request and returns a request result.

In a possible implementation, the sending the current IO request to a disk specifically includes: sending the current IO request to the disk when a scheduling moment corresponding to the current IO request is less than a current moment.

According to a third aspect, an IO request scheduling apparatus is provided, including: a request acquisition unit, configured to obtain a target IO request to be scheduled; a category determining unit, configured to determine whether the target IO request is a traffic-limited IO request; a scheduling moment determining unit, configured to: when the target IO request is a traffic-unlimited first-type IO request, determine a current moment as a scheduling moment of the target IO request; or when the target IO request is a traffic-limited second-type IO request, determine a scheduling moment of the target IO request based on a current resource traffic-limiting proportion, where the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and a request scheduling unit, configured to add the target IO request to an IO request set, where several IO requests in the IO request set are sequentially sent to a disk for processing in ascending order of scheduling moments.

In a possible implementation, the first-type IO request includes a foreground IO request, and the second-type IO request includes a background IO request.

In a possible implementation, the request scheduling unit is specifically configured to add the target IO request to an IO request set managed by using a minimum heap.

In a possible implementation, the scheduling moment determining unit includes: a calculation subunit, configured to calculate an expected scheduling moment of the target IO request based on the current resource traffic-limiting proportion and a scheduling moment of an obtained last second-type IO request, where the expected scheduling moment is negatively correlated with the current resource traffic-limiting proportion; and a first determining subunit, configured to determine the larger value of the current moment and the expected scheduling moment as the scheduling moment of the target IO request.

In a possible implementation, the scheduling moment determining unit further includes a second determining subunit, configured to determine an expected read/write frequency corresponding to request bandwidth of the target IO request based on performance of the disk, where the calculation subunit is specifically configured to calculate the expected scheduling moment of the target IO request based on the expected read/write frequency, the current resource traffic-limiting proportion, and the scheduling moment of the obtained last second-type IO request, where the expected scheduling moment is negatively correlated with the expected read/write frequency.

In a possible implementation, the apparatus further includes a request processing unit, configured to: when the target IO request is a traffic-unlimited first-type IO request, determine a first moment of obtaining the target IO request; at a second moment, select the target IO request from the IO request set, and send the target IO request to the disk, where at the second moment, the scheduling moment of the target IO request is a smallest value of all IO requests included in the IO request set; receive a request result returned by the disk; send the request result to an application corresponding to the target IO request, and determine a third moment of sending the request result; and determine a response time of the target IO request based on the third moment and the first moment.

In a possible implementation, the apparatus further includes a calculation unit, configured to: when an end moment of the current time period is reached, determine a next resource traffic-limiting proportion of a next time period based on current load information of first-type IO requests scheduled in the current time period, where the current load information specifically includes an average response time of the first-type IO requests scheduled in the current time period and average request bandwidth of the first-type IO requests scheduled in the current time period.

In a possible implementation, the calculation unit is specifically configured to: determine an expected response time corresponding to the average request bandwidth based on the performance of the disk; and when the average response time is not less than the expected response time, reduce the current resource traffic-limiting proportion based on a predetermined step to obtain the next resource traffic-limiting proportion of the next time period; or when the average response time is less than the expected response time, increase the current resource traffic-limiting proportion based on a predetermined step to obtain the next resource traffic-limiting proportion of the next time period.

In a possible implementation, the next resource traffic-limiting proportion of the next time period is not greater than a first predetermined threshold and is not less than a second predetermined threshold.

According to a fourth aspect, an IO request scheduling apparatus is provided, including: an acquisition unit, configured to obtain an IO request set, where the IO request set is obtained by using the apparatus according to any one of the implementations of the third aspect, the IO request set includes several IO requests, and each IO request has a corresponding scheduling moment; a selection unit, configured to select, from the IO request set, an IO request with a smallest scheduling moment as a current IO request; and a sending unit, configured to send the current IO request to a disk, so that the disk processes the current IO request and returns a request result.

In a possible implementation, the sending unit is configured to send the current IO request to the disk when a scheduling moment corresponding to the current IO request is less than a current moment.

According to a fifth aspect, a computer-readable storage medium is provided. A computer program is stored on the computer-readable storage medium, and when the computer program is executed in a computing device, the computing device implements the method according to any one of the implementations of the first aspect or the second aspect.

According to a sixth aspect, a computing device is provided, including a memory and a processor. The memory stores a computer program, and when executing the computer program, the processor implements the method according to any one of the implementations of the first aspect or the second aspect.

According to the methods and the apparatuses provided in the one or more embodiments of this specification, IO requests are classified into traffic-unlimited first-type IO requests and traffic-limited second-type IO requests, and a traffic-limiting status of second-type IO requests in a current time period is dynamically adjusted based on load information of first-type IO requests scheduled in a last time period, to implement adaptive IO resource allocation based on load of a disk. As such, IO resource occupation of the second-type IO request can be reduced when the load of the disk is high, to ensure that the traffic-unlimited first-type IO request can be executed as soon as possible, in other words, to ensure efficient running of the system to improve user experience, and IO resource occupation of the second-type IO request can be increased when the load of the disk is low, to accelerate execution of the second-type IO request, thereby implementing better IO request scheduling.

BRIEF DESCRIPTION OF DRAWINGS

To describe the technical solutions in the embodiments of this specification more clearly, the following briefly describes the accompanying drawings needed for describing the embodiments. Clearly, the accompanying drawings in the following description show merely some embodiments of this specification, and a person of ordinary skill in the art can still derive other drawings from these accompanying drawings without creative efforts.

DESCRIPTION OF EMBODIMENTS

Figure 1:
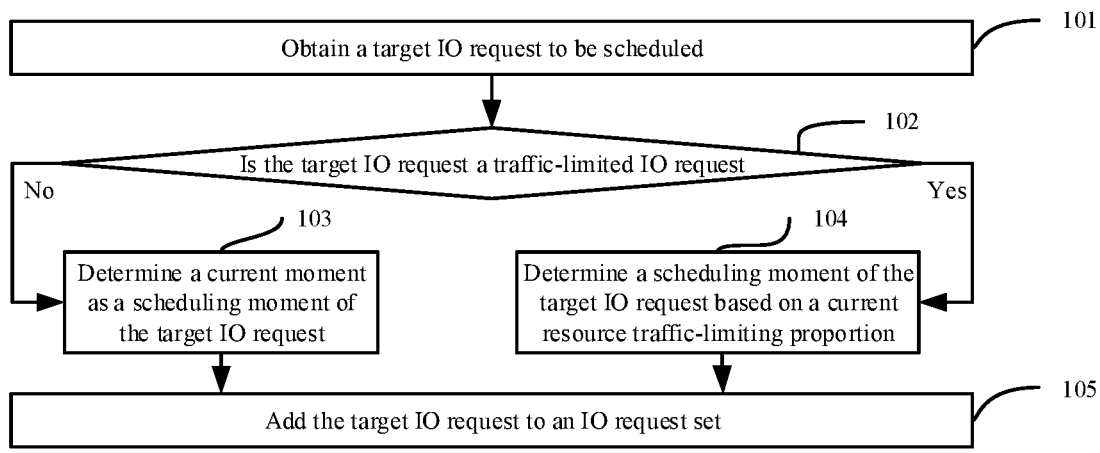
FIG. 1 is a flowchart illustrating an IO request scheduling method, according to an embodiment of this specification.

The following describes in detail unlimited embodiments provided in this specification with reference to the accompanying drawings.

In some data storage systems including an LSM structure-based database, IO requests scheduled in a unit time usually include two types of IO requests: a foreground IO request and a background IO request.

The LSM-based database is used as an example. A process of writing new data includes the following: First, as a memory data structure of LSM, an active memtable is responsible for writing new data by an application. After new data of a corresponding size is written into the active memtable, writing is stopped, and the active memtable is frozen as a frozen memtable. In addition, a new active memtable is created to be responsible for writing new data. Then a system background can schedule a dump task. The dump task can convert a format of the frozen memtable and dump the frozen memtable to a disk to generate an SSTable structure file. Afterwards, the memory occupied by the frozen memtable can be released for use by a subsequent active memtable. The SSTable structure file is also expressed as a dump SSTable. In addition, after a quantity of dump SSTables accumulates to a corresponding quantity, the system background schedules a merge task to merge the corresponding quantity of dump SSTables into a baseline SSTable, and writes the baseline SSTable into the disk. It is worthwhile to note that the dump task or the merge task writes the dump SSTable or the baseline SSTable into the disk by initiating several IO requests to the disk. All IO requests initiated by background tasks such as the dump task and/or the merge task are background IO requests.

The LSM-based database is used as an example. When reading data, an application needs to initiate a data query request (the data query request is a foreground task). First, the application queries a memtable in the memory based on the data query request. If the memtable in the memory does not include target data that the data query request expects to query, several IO requests need to be initiated to the disk to read the target data from the SSTable in the disk. The IO request initiated by the data query request is a foreground IO request.

The IO request initiated by the background task and the IO request initiated by the foreground task compete for IO resources of the disk. For example, during execution of the dump task and the merge task, large-scale data needs to be written into the disk by using a large quantity of background IO requests. If there are many foreground tasks, because the background IO requests occupy too many disk bandwidth/IO resources, a response time of a foreground IO request corresponding to the foreground task increases, and as a result, a response time of the entire foreground task increases or a timeout occurs in the entire foreground task.

It is worthwhile to note that when a data query request queries a plurality of data sources, or more than a predetermined quantity of IO requests need to be used to read, from the SSTable in the disk, target data that a certain data query request expects to read, the data query request can be referred to as a big query request. The big query request affects a response time of an IO request initiated by another foreground task, result in an increase in a response time of the another foreground task or even a timeout in the another foreground task.

Some IO requests usually need to be directly traffic-limited. For example, a background IO request and/or an IO request corresponding to a big query request are/is directly traffic-limited, so that another IO request can be processed as soon as possible, and efficient running of the system is ensured to improve user experience. However, if some IO requests are directly traffic-limited, another problem may occur because the traffic-limited IO requests cannot be executed quickly all the time. For example, if a background IO request is directly traffic-limited, the dump task and the merge task may be executed slowly, and even memory space may be insufficient for more active memtables to write new data.

In view of the above-mentioned problems, embodiments of this specification provide at least IO request scheduling methods and apparatuses. IO requests are classified into traffic-unlimited first-type IO requests and traffic-limited second-type IO requests, and a traffic-limiting status of second-type IO requests in a current time period is dynamically adjusted based on load information of first-type IO requests scheduled in a last time period, to implement adaptive IO resource allocation based on load of a disk. As such, IO resource occupation of the second-type IO request can be reduced when the load of the disk is high, to ensure that the traffic-unlimited first-type IO request can be executed as soon as possible, in other words, to ensure efficient running of the system to improve user experience, and IO resource occupation of the second-type IO request can be increased when the load of the disk is low, to accelerate execution of the second-type IO request, thereby implementing better IO request scheduling.

FIG. 1 is a flowchart illustrating an IO request scheduling method, according to an embodiment of this specification. The method can be performed by a computing device. The method can include at least the following steps: Step 101: Obtain a target IO request to be scheduled.

The target IO request can include a foreground IO request or a background IO request.

Step 102: Determine whether the target IO request is a traffic-limited IO request.

IO requests can be classified into two categories, namely, traffic-unlimited first-type IO requests and traffic-limited second-type IO requests. How to specifically classify the IO requests into the first-type IO requests and the second-type IO requests can be flexibly configured with reference to an actual service requirement. For example, all foreground IO requests can be classified under the traffic-unlimited first-type IO requests, and all background IO requests can be classified under the traffic-limited second-type IO requests; or foreground IO requests other than an IO request corresponding to a big query request in all foreground IO requests can be classified under the first-type IO requests, and the IO request corresponding to the big query request and all background IO requests can be classified under the second-type IO requests.

When the target IO request is a traffic-unlimited first-type IO request, step 103 is performed to determine a current moment as a scheduling moment of the IO request, and then step 105 is performed.

When the target IO request is a traffic-limited second-type IO request, step 104 is performed to determine a scheduling moment of the target IO request based on a current resource traffic-limiting proportion, and then step 105 is performed.

The current resource traffic-limiting proportion is a proportion of resources used to process second-type IO requests in a current time period that the current moment belongs. A larger proportion indicates allowing more IO resources to be used to process the second-type IO requests. In an example, the current resource traffic-limiting proportion is calculated based on a last resource traffic-limiting proportion and last load information of a last time period, the last load information is load information of first-type IO requests scheduled in the last time period, and the scheduling moment of the target IO request is not less than the current moment.

Figure 2:
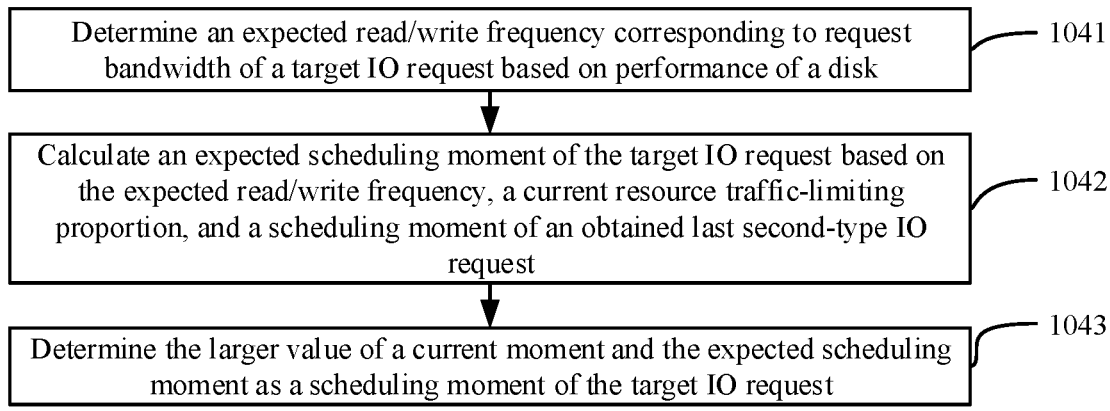
FIG. 2 is a schematic diagram illustrating a process of determining a scheduling moment of a second-type IO request, according to an embodiment of this specification.

In a more specific example, as shown in FIG. 2, step 104 can include the following steps: Step 1041: Determine an expected read/write frequency corresponding to request bandwidth of the target IO request based on performance of a disk.

The performance of the disk can be measured by using io_benchmark or other disk performance measurement tools during initialization of a data storage system of the computing device, to obtain the performance of the disk.

For example, when the disk processes a foreground IO request of sample request bandwidth (io_size is subsequently used to represent request bandwidth of a single IO request), a sample response time (io_rt is subsequently used to represent a response time of a single IO request) and a sample IO request count per second (IOPS) corresponding to the sample io_size can be measured. Then sample io_size, sample io_rt, and the sample IOPS in this group are stored, for example, in a configuration file io_resource.conf. After sample io_size, sample io_rt, and sample IOPSs in a plurality of groups are measured and stored, products of sample io_size and sample IOPSs in different groups are usually equal or approximately equal, and a product of sample io_size and the sample IOPS can be used to represent IO resources/bandwidth provided by the disk. Therefore, a first linear relationship between sample io_size and the sample IOPS can be obtained by performing linear fitting on sample io_size and sample IOPSs, for example, performing logarithmic linear fitting, and a second linear relationship between sample io_size and sample io_rt, namely, a second linear relationship between variable io_size and variable io_rt, can be obtained by performing linear fitting, for example, simple linear fitting, on sample io_size and sample io_rt in the plurality of groups. Finally, the first linear relationship and the second linear relationship are stored, so that the first linear relationship and the second linear relationship can be subsequently used. The first linear relationship and the second linear relationship can be used to describe the performance of the disk.

Correspondingly, in step 1041, io_size of the target IO request can be specifically substituted into variable io_size in the first linear relationship, to calculate the value of the variable IOPS in the first linear relationship. The value of the variable IOPS is the expected read/write frequency corresponding to io_size of the target IO request.

Step 1042: Calculate an expected scheduling moment of the target IO request based on the expected read/write frequency, the current resource traffic-limiting proportion, and a scheduling moment of an obtained last second-type IO request.

The expected scheduling moment of the target IO request can be a sum of the scheduling moment of the last second-type IO request and an expected time difference. The expected time difference is negatively correlated with the expected read/write frequency, and is also negatively correlated with the current resource traffic-limiting proportion. In other words, if the expected read/write frequency is larger and the current resource traffic-limiting proportion is larger, it is expected that the target IO request obtained this time can be processed in a shorter time period after the last second-type IO request is processed. Therefore, the expected time difference is smaller.

For example, the expected scheduling moment of the target IO request can be calculated by using the following equation 1:

$$\text{Expect\_deadline} = \text{last\_deadline} + 1/(a * \text{Expect\_IOPS}) \quad (1)$$

Expect_deadline represents the expected scheduling moment of the target IO request, last_deadline represents the scheduling moment of the previously obtained last second-type IO request, a represents the current resource traffic-limiting proportion, and Expect_IOPS represents the expected read/write frequency.

It is worthwhile to note that step 1041 is optional. Correspondingly, in step 1042, the expected scheduling moment of the target IO request obtained this time can be calculated based on the current resource traffic-limiting proportion and the scheduling moment of the last second-type IO request. For example, Expect_IOPS in the above-mentioned equation 1 can be deleted as an unnecessary parameter.

Step 1043: Determine the larger value of the current moment and the expected scheduling moment as the scheduling moment of the target IO request.

When the current moment is the larger value, it indicates that load of the disk may be relatively small, and the current moment is used as the scheduling moment of the target IO request, so that the IO request can be processed as soon as possible.

When the expected scheduling moment is the larger value, it indicates that the obtained last second-type IO request may have not been sent to the disk for processing, load of the disk may be relatively large, and the expected scheduling moment is used as the scheduling moment of the target IO request, so that traffic of the second-type IO request is limited, more IO resources in a unit time can be used to process first-type IO requests, and it can also be ensured that the obtained last second-type IO request can be processed earlier than the target IO request.

Referring back to FIG. 1, in step 105, the target IO request is added to an IO request set.

Several IO requests in the IO request set are sequentially sent to the disk for processing in ascending order of scheduling moments. In a more specific example, to quickly select an IO request with a smallest scheduling moment from the IO request set in a subsequent process, the several IO requests in the IO request set can be sorted in ascending order of scheduling moments to form an IO request sequence; or the IO request set is managed by using a minimum heap in a heap structure. The minimum heap is a complete binary tree that has been sorted based on scheduling moments, and a scheduling moment of an IO request used as a root node is a smallest value of the several IO requests.

Figure 3:
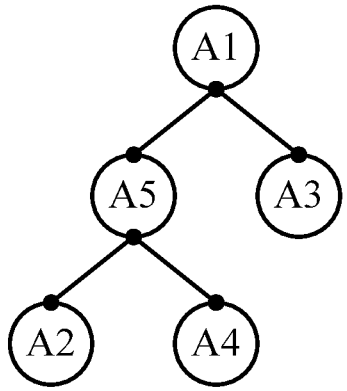
FIG. 3 is a schematic diagram illustrating managing an IO request set by using a minimum heap, according to an embodiment of this specification.

For example, the IO request set includes IO requests A1, A2, A3, and A4 and a target IO request A5 added to the IO request set this time. Assuming that a sequence A1, A5, A2, A3, and A4 can be formed when the IO requests are arranged in ascending order of scheduling moments, a complete binary tree, shown in FIG. 3, whose root node is A1 may be formed when the IO request set is managed by using a minimum heap. It is worthwhile to note that the complete binary tree is merely an example, in other words, except that the root node is A1, locations of other nodes may be different from those in the complete binary tree shown in FIG. 3.

Figure 4:
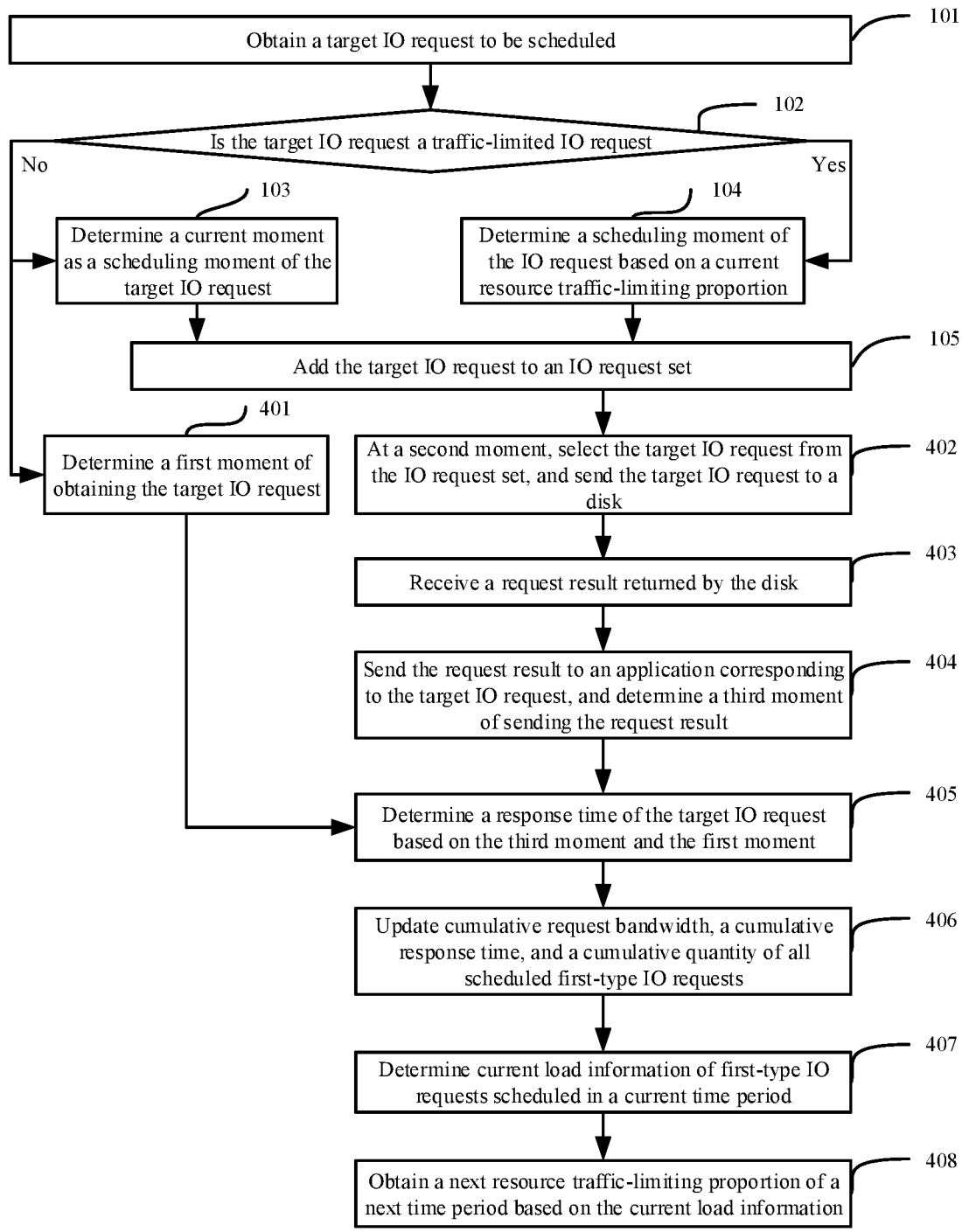
FIG. 4 is a flowchart illustrating another IO request scheduling method, according to an embodiment of this specification.

In some embodiments, when the target IO request obtained in FIG. 1 is a traffic-unlimited first-type IO request, a response time of the target IO request can be further determined based on a situation in which the target IO request is read from the IO request set and processed, where the response time is used to determine load information of the first-type IO request, so as to update the above-mentioned resource traffic-limiting proportion. Referring to FIG. 4, the following describes a processing process of the target IO request which is a first-type IO request. As shown in FIG. 4, the processing process is on the basis of FIG. 1, and can further include further processing steps. Details are described below.

When the target IO request is determined as a first-type IO request by using the above-mentioned step 102, step 401 is further performed to determine a current moment of obtaining the target IO request. The current moment is denoted as a first moment.

In addition, as previously described, in step 105, the target IO request is added to the IO request set, and the IO requests are sequentially read from the IO request set in ascending order of scheduling moments. To be specific, each time an IO request is read from the IO request set for processing, an IO request whose scheduling moment is currently smallest "pops up" from the IO request set. As such, as IO requests with smaller scheduling moments are sequentially read, at some moments, the target IO request becomes an IO request with a smallest scheduling moment in the IO request set. In this case, when an IO request is read from the IO request set, the target IO request is read. The moment is denoted as a second moment.

Therefore, in step 402, at the second moment, the target IO request is selected from the IO request set and sent to the disk. At the second moment, the scheduling moment of the target IO request is a smallest value of all the IO requests included in the IO request set.

Step 403: Receive a request result returned by the disk.

Step 404: Send the request result to an application corresponding to the target IO request, and determine a third moment of sending the request result.

Step 405: Determine a response time of the target IO request based on the third moment and the first moment.

To be specific, a time difference between the third moment and the first moment is determined as the response time of the target IO request.

In some embodiments, to facilitate subsequent update to a next resource traffic-limiting proportion of a next time period, step 406 can be further performed after step 405, to update cumulative request bandwidth and a cumulative response time of all scheduled first-type IO requests based on the response time and the request bandwidth of the target IO request, and update a cumulative quantity of all scheduled first-type IO requests.

For example, parameter cumulative_size used to store the cumulative request bandwidth, parameter cumulative_rt used to store the cumulative response time, and parameter cumulative_count used to store the cumulative quantity can be defined. Initial values of the three parameters can all be 0. In step 406, values of cumulative_size and cumulative_rt are specifically updated based on the request bandwidth and the response time of the target IO request, and the value of cumulative_count is increased by 1.

In some embodiments, further, the response time and the request bandwidth of the currently processed target IO request can be independently stored, and a quantity of first-type IO requests scheduled in the current time period can be independently updated, so that current load information of the first-type IO requests scheduled in the current time period is determined based on the data, and the next resource traffic-limiting proportion of the next time period is obtained based on the current load information.

Correspondingly, when an end moment of the current time period is reached, step 407 can be further performed to determine the current load information of the first-type IO requests scheduled in the current time period; and step 408 is performed to obtain the next resource traffic-limiting proportion of the next time period based on the current load information.

Duration of a single time period can be flexibly configured, for example, configured as 100 ms or another value.

The current load information includes an average response time of the first-type IO requests scheduled in the current time period and average request bandwidth of the first-type IO requests scheduled in the current time period.

For example, when an end moment of the last time period is reached, the value of cumulative_count is last_count, the value of cumulative_size is last_size, and the value of cumulative_rt is last_rt. When the end time of the current time period is reached, the value of cumulative_count is current_count, the value of cumulative_size is current_size, and the value of cumulative_rt is current_rt. Therefore, the average request bandwidth can be calculated by using the following equation 2:

$$\text{avg\_size} = (\text{current\_size} - \text{last\_size}) / (\text{current\_count} - \text{last\_count}) \quad (2)$$

avg_size represents the average request bandwidth.

The average response time can be calculated by using the following equation 3:

$$\text{avg\_rt} = (\text{current\_rt} - \text{last\_rt})(\text{current\_count} - \text{last\_count}) \quad (3)$$

avg_rt represents the average response time.

Figure 5:
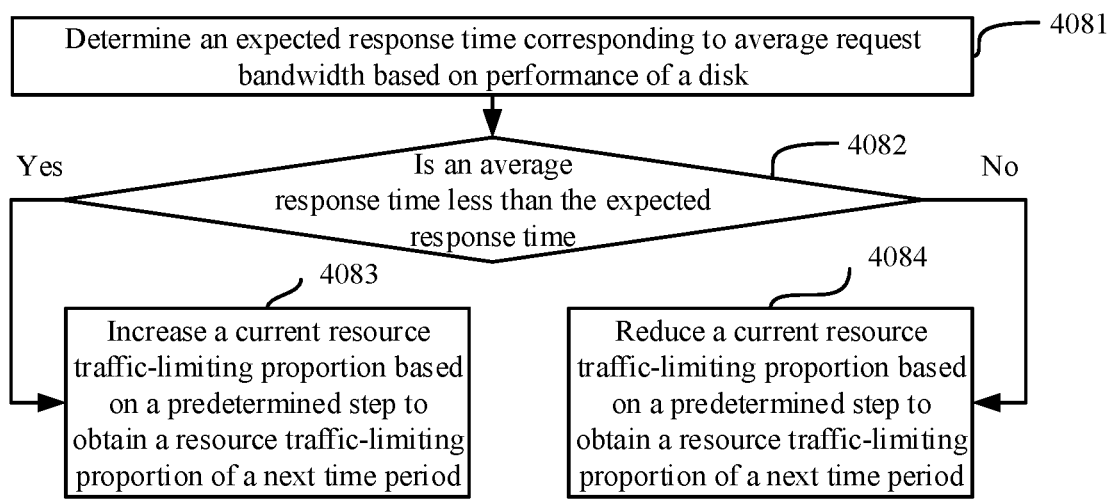
FIG. 5 is a schematic diagram illustrating a process of obtaining a resource proportion of a next time period, according to an embodiment of this specification.

In a more specific example, referring to FIG. 5, step 408 can include the following steps: Step 4081: Determine an expected response time corresponding to the average request bandwidth based on the performance of the disk.

As previously described, the performance of the disk can be described by using the first linear relationship and the second linear relationship. Here, the average request bandwidth can be substituted into variable io_size in the second linear relationship, to calculate the value of variable io_rt in the second linear relationship. The value of variable io_rt is the expected response time corresponding to the average request bandwidth.

Step 4082: Determine whether the average response time is less than the expected response time.

If yes, step 4083 is performed to increase the current resource traffic-limiting proportion based on a predetermined step to obtain the resource traffic-limiting proportion of the next time period.

If no, step 4084 is performed to reduce the current resource traffic-limiting proportion based on a predetermined step to obtain the resource traffic-limiting proportion of the next time period.

If the average response time is less than the expected response time, it indicates that the load of the disk is relatively low, the resource traffic-limiting proportion is increased, and a traffic-limiting force on second-type IO requests is reduced, so that more IO resources can be used to process the second-type IO requests in the next time period. If the average response time is not less than the expected response time, it indicates that the load of the disk is relatively high, the resource traffic-limiting proportion is reduced, and a traffic-limiting force on second-type IO requests is increased, so that more IO resources can be used to process first-type IO requests in the next time period.

In some embodiments, a value range of the resource traffic-limiting proportion can be predetermined, in other words, the value of the resource traffic-limiting proportion is predetermined to be not greater than a first predetermined threshold and not less than a second predetermined threshold. Correspondingly, if the current resource traffic-limiting proportion of the current time period is the first predetermined threshold or the second predetermined threshold, the current resource traffic-limiting proportion continues to be used as the resource traffic-limiting proportion of the next time period, and the resource traffic-limiting proportion of the next time period is not obtained again by using step 4083 or step 4084.

The first predetermined threshold, the second predetermined threshold, and the predetermined step can be flexibly configured. For example, the first predetermined threshold is configured as 50%, the second predetermined threshold is configured as 10%, and the predetermined step is configured as 1%.

Figure 6:
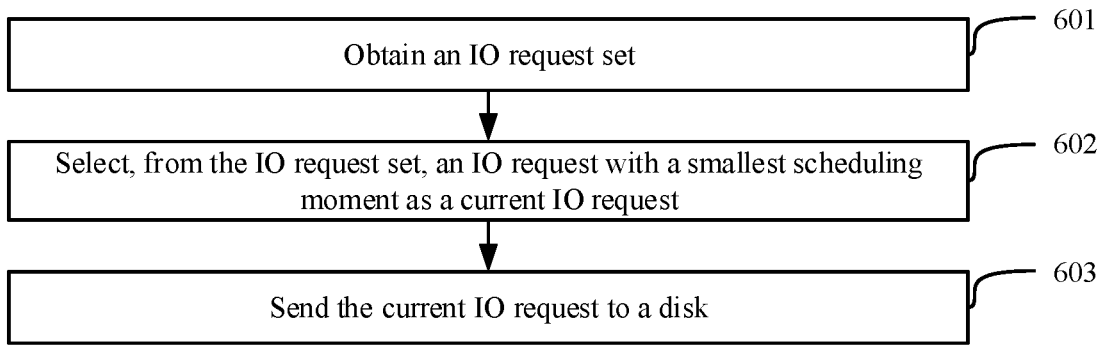
FIG. 6 is a flowchart illustrating still another IO request scheduling method, according to an embodiment of this specification.

Corresponding to the above-mentioned method embodiments, an embodiment of this specification further provides another IO request scheduling method. The method is performed by a computing device. As shown in FIG. 6, the method includes the following steps: Step 601: Obtain an IO request set.

The IO request set includes several IO requests, and each IO request is added to the IO request set by using the method in the embodiment shown in FIG. 1 or FIG. 4.

Step 602: Select, from the IO request set, an IO request with a smallest scheduling moment as a current IO request. The current IO request may be a traffic-unlimited first-type IO request, or may be a traffic-limited second-type IO request.

Step 603: Send the current IO request to a disk.

In a possible implementation, after the current IO request is selected, if an IO resource that can be used to send the current IO request to the disk exists, step 603 is immediately performed.

In a possible implementation, after the current IO request is selected, it can be further determined whether a scheduling moment of the current IO request is less than a current moment. Step 602 is performed if the scheduling moment of the current IO request is less than the current moment and an IO resource that can be used to send the current IO request to the disk exists. If the scheduling moment of the current IO request is not less than the current moment, even if an IO resource that can be used to send the current IO request to the disk exists, an IO request with a smallest scheduling moment is re-selected from the IO request set as a new current IO request by using step 602. For an IO request that has been selected and fails to be sent to the disk, the IO request can be sent to the disk by performing step 603 when the current moment is greater than a scheduling moment of the IO request.

When the current IO request is a first-type IO request, a second moment of selecting the current IO request from the IO request set is greater than the scheduling moment of the current IO request, and the current moment is necessarily greater than the scheduling moment of the current IO request. The above-mentioned two implementations can ensure that the current IO request can be sent to the disk for processing as soon as possible.

When the current IO request is a second-type IO request, a current moment after the current IO request is selected from the IO request set may be less than the scheduling moment of the current IO request. The current moment being less than the scheduling moment of the current IO request indicates that load of the disk at the current moment may be relatively small. If the current IO request is directly sent to the disk for processing, IO resources occupied by second-type IO requests in a unit time can be increased to accelerate processing of the second-type IO requests. If the current IO request is not sent to the disk for processing until the current moment is less than the scheduling moment of the current IO request, it can be ensured that the second-type IO requests do not occupy too many IO resources, and first-type IO requests can be sent to the disk for processing as soon as possible.

It is worthwhile to note that when the current IO request is a first-type IO request, the method can further include some or all of step 403 to step 406 in the above-mentioned method embodiment shown in FIG. 4.

Figure 7:
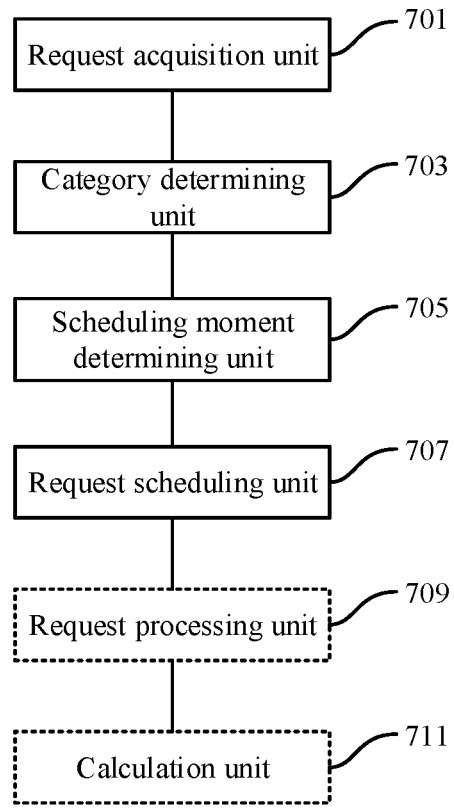
FIG. 7 is a schematic diagram illustrating a structure of an IO request scheduling apparatus, according to an embodiment of this specification.

Based on the same concept as the above-mentioned method embodiments, an embodiment of this specification further provides an IO request scheduling apparatus. As shown in FIG. 7, the apparatus includes a request acquisition unit 701, configured to obtain a target IO request to be scheduled; a category determining unit 703, configured to determine whether the target IO request is a traffic-limited IO request; a scheduling moment determining unit 705, configured to: when the target IO request is a traffic-unlimited first-type IO request, determine a current moment as a scheduling moment of the target IO request; or when the target IO request is a traffic-limited second-type IO request, determine a scheduling moment of the target IO request based on a current resource traffic-limiting proportion, where the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and a request scheduling unit 707, configured to add the target IO request to an IO request set, where several IO requests in the IO request set are sequentially sent to a disk for processing in ascending order of scheduling moments.

In a possible implementation, the first-type IO request includes a foreground IO request, and the second-type IO request includes a background IO request.

In a possible implementation, the request scheduling unit 707 is specifically configured to add the target IO request to an IO request set managed by using a minimum heap.

In a possible implementation, the scheduling moment determining unit 705 includes: a calculation subunit, configured to calculate an expected scheduling moment of the target IO request based on the current resource traffic-limiting proportion and a scheduling moment of an obtained last second-type IO request, where the expected scheduling moment is negatively correlated with the current resource traffic-limiting proportion; and a first determining subunit, configured to determine the larger value of the current moment and the expected scheduling moment as the scheduling moment of the target IO request.

In a possible implementation, the scheduling moment determining unit 705 further includes a second determining subunit, configured to determine an expected read/write frequency corresponding to request bandwidth of the target IO request based on performance of the disk, where the calculation subunit is specifically configured to calculate the expected scheduling moment of the target IO request based on the expected read/write frequency, the current resource traffic-limiting proportion, and the scheduling moment of the obtained last second-type IO request, where the expected scheduling moment is negatively correlated with the expected read/write frequency.

In a possible implementation, the apparatus further includes a request processing unit 709, configured to: when the target IO request is a traffic-unlimited first-type IO request, determine a first moment of obtaining the target IO request; at a second moment, select the target IO request from the IO request set, and send the target IO request to the disk, where at the second moment, the scheduling moment of the target IO request is a smallest value of all IO requests included in the IO request set; receive a request result returned by the disk; send the request result to an application corresponding to the target IO request, and determine a third moment of sending the request result; and determine a response time of the target IO request based on the third moment and the first moment.

In a possible implementation, the apparatus further includes a calculation unit 711, configured to: when an end moment of the current time period is reached, determine a next resource traffic-limiting proportion of a next time period based on current load information of first-type IO requests scheduled in the current time period, where the current load information specifically includes an average response time of the first-type IO requests scheduled in the current time period and average request bandwidth of the first-type IO requests scheduled in the current time period.

In a possible implementation, the calculation unit 711 is specifically configured to: determine an expected response time corresponding to the average request bandwidth based on the performance of the disk; and when the average response time is not less than the expected response time, reduce the current resource traffic-limiting proportion based on a predetermined step to obtain the next resource traffic-limiting proportion of the next time period; or when the average response time is less than the expected response time, increase the current resource traffic-limiting proportion based on a predetermined step to obtain the next resource traffic-limiting proportion of the next time period.

In a possible implementation, the next resource traffic-limiting proportion of the next time period is not greater than a first predetermined threshold and is not less than a second predetermined threshold.

Figure 8:
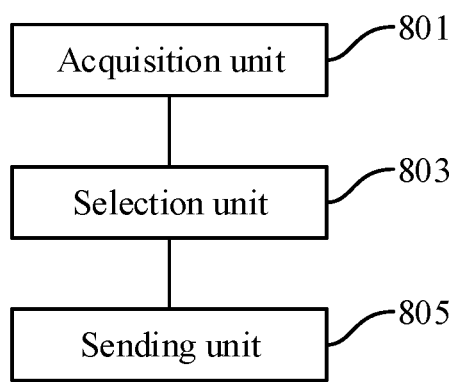
FIG. 8 is a schematic diagram illustrating a structure of another IO request scheduling apparatus, according to an embodiment of this specification.

Based on the same concept as the above-mentioned method embodiments, an embodiment of this specification further provides an IO request scheduling apparatus. As shown in FIG. 8, the apparatus includes: an acquisition unit 801, configured to obtain an IO request set, where the IO request set is obtained by using the method shown in FIG. 1 or FIG. 4, the IO request set includes several IO requests, and each IO request has a corresponding scheduling moment; a selection unit 803, configured to select, from the IO request set, an IO request with a smallest scheduling moment as a current IO request; and a sending unit 805, configured to send the current IO request to a disk, so that the disk processes the current IO request and returns a request result.

In a possible implementation, the sending unit 805 is configured to send the current IO request to the disk when a scheduling moment corresponding to the current IO request is less than a current moment.

A person skilled in the art should be aware that in the above-mentioned one or more examples, functions described in this specification can be implemented by hardware, software, firmware, or any combination thereof. When software is used for implementation, a computer program corresponding to these functions can be stored in a computer-readable medium or transmitted as one or more instructions/code on the computer-readable medium, so that when the computer program corresponding to these functions is executed by a computer, the computer implements the method according to any one of the embodiments of this specification.

An embodiment of this specification further provides a computer-readable storage medium. A computer program is stored on the computer-readable storage medium, and when the computer program is executed in a computing device, the computing device performs the IO request scheduling method provided in any one of the embodiments of this specification.

An embodiment of this specification further provides a computing device, including a memory and a processor. The memory stores executable code, and when executing the executable code, the processor implements the IO request scheduling method provided in any one of the embodiments of this specification.

The embodiments in this specification are all described in a progressive way. For same or similar parts of the embodiments, mutual references can be made to the embodiments. Each embodiment focuses on a difference from other embodiments. Particularly, some apparatus embodiments are briefly described since they are basically similar to some method embodiments. For related parts, references can be made to related descriptions in the method embodiments.

Specific embodiments of this specification are described above. Other embodiments fall within the protection scope of this specification. In some cases, some actions or steps can be performed in a sequence different from that in the embodiments and desired results can still be achieved. In addition, processes described in the accompanying drawings do not necessarily need a specific order or a sequential order shown to achieve the desired results. In some implementations, multi-tasking and parallel processing are feasible or may be advantageous.

The objectives, technical solutions, and beneficial effects of this specification are further described in detail in the above-mentioned specific implementations. It should be understood that the above-mentioned descriptions are merely specific implementations of this specification, but are not intended to limit the protection scope of this specification. Any modification, equivalent replacement, or improvement made based on the technical solutions of this specification shall fall within the protection scope of this specification.

What is claimed is:

1. An IO request scheduling method, comprising:
    obtaining a target IO request to be scheduled, and determining whether the target IO request is a traffic-limited IO request;
    when the target IO request is a traffic-unlimited first-type IO request, determining a current moment as a scheduling moment of the target IO request;
    when the target IO request is a traffic-limited second-type IO request, determining a scheduling moment of the target IO request based on a current resource traffic-limiting proportion, wherein the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and
    adding the target IO request to an IO request set, wherein several IO requests in the IO request set are sequentially sent to a disk for processing in ascending order of scheduling moments.

2. The method according to claim 1, wherein the first-type IO request comprises a foreground IO request, and the second-type IO request comprises a background IO request.

3. The method according to claim 1, wherein the adding the target IO request to an IO request set specifically comprises: adding the target IO request to an IO request set managed by using a minimum heap.

4. The method according to claim 1, wherein the determining a scheduling moment of the target IO request based on a current resource traffic-limiting proportion comprises:
    calculating an expected scheduling moment of the target IO request based on the current resource traffic-limiting proportion and a scheduling moment of an obtained last second-type IO request, wherein the expected scheduling moment is negatively correlated with the current resource traffic-limiting proportion; and
    determining the larger value of the current moment and the expected scheduling moment as the scheduling moment of the target IO request.

5. The method according to claim 4, wherein the determining a scheduling moment of the target IO request based on a current resource traffic-limiting proportion further comprises: determining an expected read/write frequency corresponding to request bandwidth of the target IO request based on performance of the disk; and
    the calculating an expected scheduling moment of the target IO request based on the current resource traffic-limiting proportion and a scheduling moment of an obtained last second-type IO request specifically comprises: calculating the expected scheduling moment of the target IO request based on the expected read/write frequency, the current resource traffic-limiting proportion, and the scheduling moment of the obtained last second-type IO request, wherein the expected scheduling moment is negatively correlated with the expected read/write frequency.

6. The method according to claim 1, wherein when the target IO request is a traffic-unlimited first-type IO request, the method further comprises:
    determining a first moment of obtaining the target IO request;
    at a second moment, selecting the target IO request from the IO request set, and sending the target IO request to the disk, wherein at the second moment, the scheduling moment of the target IO request is a smallest value of all IO requests comprised in the IO request set;
    receiving a request result returned by the disk;
    sending the request result to an application corresponding to the target IO request, and determining a third moment of sending the request result; and
    determining a response time of the target IO request based on the third moment and the first moment.

7. The method according to claim 6, further comprising: when an end moment of the current time period is reached, determining a next resource traffic-limiting proportion of a next time period based on current load information of first-type IO requests scheduled in the current time period, wherein the current load information specifically comprises an average response time of the first-type IO requests scheduled in the current time period and average request bandwidth of the first-type IO requests scheduled in the current time period.

8. The method according to claim 7, wherein the determining a next resource traffic-limiting proportion of a next time period based on current load information of first-type IO requests scheduled in the current time period comprises:
determining an expected response time corresponding to the average request bandwidth based on the performance of the disk; and
when the average response time is not less than the expected response time, reducing the current resource traffic-limiting proportion based on a predetermined step to obtain the next resource traffic-limiting proportion of the next time period; or when the average response time is less than the expected response time, increasing the current resource traffic-limiting proportion based on a predetermined step to obtain the next resource traffic-limiting proportion of the next time period.

9. The method according to claim 7, wherein the next resource traffic-limiting proportion of the next time period is not greater than a first predetermined threshold and is not less than a second predetermined threshold.

10. The method according to claim 1, further comprising:
selecting, from the IO request set, an IO request with a smallest scheduling moment as a current IO request; and
sending the current IO request to the disk, so that the disk processes the current IO request and returns a request result.

11. The method according to claim 10, wherein the sending the current IO request to the disk specifically comprises: sending the current IO request to the disk when a scheduling moment corresponding to the current IO request is less than a current moment.

12. A computing device, comprising:
a processor;
a memory storing executable instructions that in response to execution by the processor, causes the processor to:
obtain a target IO request to be scheduled, and determine whether the target IO request is a traffic-limited IO request;
when the target IO request is a traffic-unlimited first-type IO request, determine a current moment as a scheduling moment of the target IO request;
when the target IO request is a traffic-limited second-type IO request, determine a scheduling moment of the target IO request based on a current resource traffic-limiting proportion, wherein the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and
add the target IO request to an IO request set, wherein several IO requests in the IO request set are sequentially sent to a disk for processing in ascending order of scheduling moments.

13. A non-transitory computer-readable storage medium comprising instructions stored therein that, when executed by a processor of a computing device, cause the processor to:
obtain a target IO request to be scheduled, and determine whether the target IO request is a traffic-limited IO request;
when the target IO request is a traffic-unlimited first-type IO request, determine a current moment as a scheduling moment of the target IO request;
when the target IO request is a traffic-limited second-type IO request, determine a scheduling moment of the target IO request based on a current resource traffic-limiting proportion, wherein the current resource traffic-limiting proportion is a proportion of resources used to process second-type IO requests in a current time period that the current moment belongs, the current resource traffic-limiting proportion is calculated based on a last resource traffic-limiting proportion and last load information of a last time period, the last load information is load information of first-type IO requests scheduled in the last time period, and the scheduling moment is not less than the current moment; and
add the target IO request to an IO request set, wherein several IO requests in the IO request set are sequentially sent to a disk for processing in ascending order of scheduling moments.

\* \* \* \* \*